United States Patent [19]

Van de Pas

[11] Patent Number: 5,205,957
[45] Date of Patent: Apr. 27, 1993

[54] STRUCTURED AQUEOUS LIQUID DETERGENTS CONTAINING FUNCTIONAL POLYMERS

[75] Inventor: Johannes C. Van de Pas, Vlaardingen, Netherlands

[73] Assignee: Lever Brothers Company, Division of Conopco, Inc., New York, N.Y.

[21] Appl. No.: 409,224

[22] Filed: Sep. 19, 1989

[30] Foreign Application Priority Data

Oct. 7, 1988 [GB] United Kingdom ............... 8823665

[51] Int. Cl.$^5$ ............................................. C11D 3/00
[52] U.S. Cl. ............................... 252/173; 252/174.15; 252/174.23; 252/174.25; 252/120; 252/DIG. 2; 252/DIG. 14
[58] Field of Search ............... 252/174.23, 179.15, 252/173, 179.25, DIG. 2, DIG. 14, 120

[56] References Cited

U.S. PATENT DOCUMENTS

| | | | |
|---|---|---|---|
| 4,244,840 | 1/1981 | Straw | 252/540 |
| 4,384,978 | 5/1983 | Ploog et al. | 252/354 |
| 4,452,717 | 6/1984 | Tai et al. | 252/173 |
| 4,476,037 | 10/1984 | Ploog et al. | 25/354 |
| 4,482,470 | 11/1984 | Reuter et al. | 252/162 |
| 4,530,780 | 7/1985 | Van de Pas et al. | 252/173 |
| 4,597,889 | 7/1986 | Jones et al. | 252/135 |
| 4,614,606 | 9/1986 | Machin et al. | 252/116 |
| 4,642,198 | 2/1987 | Humphreys et al. | 252/94 |
| 4,732,703 | 3/1988 | van Voorst Vader et al. | 252/532 |
| 4,911,857 | 3/1990 | Machin et al. | 252/98 |

FOREIGN PATENT DOCUMENTS

| | | |
|---|---|---|
| 0120533 | 10/1984 | European Pat. Off. . |
| 0301883 | 2/1989 | European Pat. Off. . |
| 1546829 | 5/1979 | United Kingdom . |
| 2053249 | 2/1981 | United Kingdom . |
| 2138037 | 10/1984 | United Kingdom . |
| 2168717 | 6/1986 | United Kingdom . |

OTHER PUBLICATIONS

European Search Report & Annex to European Search Report on European Patent Application No. EP 89 20 2260.
BNA's Patent, Trademark & Copyright Journal discussing the Ex parte Gilderdale case, vol. 41, pp. 62–63.

*Primary Examiner*—Prince Willis, Jr.
*Assistant Examiner*—J. Silbermann
*Attorney, Agent, or Firm*—Ronald A. Koatz

[57] ABSTRACT

An aqueous liquid detergent composition comprising water, electrolyte and detergent active material in amounts sufficient to form a structuring system capable of suspending particulate solids, said composition further comprising a functional polymer ingredient having an average molecular weight below 2000, provided that when the composition comprises:
(a) at least 15% by weight of the detergent active material and from 1 to 30% by weight of a salting-out electrolyte; or
(b) contains 5% or more of a swelling clay; and then the average molecular weight of the polymer ingredient is less than 1000; and when the functional polymer material comprises 0.5% by weight or less, relative to the total composition, of an acrylate or methacrylate polymer having a molecular weight of 500 or greater, the detergent active material comprises a synthetic anionic surfactant and a soap and the composition is free from pentasodium triphosphate; then the composition is also substantially free from insoluble abrasive;

said composition yielding no more than 2% phase separation by volume upon storage at 25° C. for 21 days.

8 Claims, No Drawings

STRUCTURED AQUEOUS LIQUID DETERGENTS CONTAINING FUNCTIONAL POLYMERS

The present invention is concerned with liquid detergent compositions of the kind in which particles of solid material can be suspended by a structure formed from detergent active material, the active structure existing as a separate phase dispersed within predominantly aqueous phase. This aqueous phase usually contains dissolved electrolyte.

Three common product forms of this type are liquids for heavy duty fabrics washing and liquid abrasive and general purpose cleaners. In the first class, the suspended solid can be substantially the same as the dissolved electrolyte, being an excess of same beyond the solubility limit. This solid is usually present as a detergency builder, i.e. to counteract the effects of calcium ion water hardness in the wash. In addition, it may be desirable to suspend substantially insoluble particles of bleach, for example diperoxydodecandioic acid (DPDA). In the second class, the suspended solid is usually a particulate abrasive, insoluble in the system. In that case the electrolyte is a different, water soluble material, present to contribute to structuring of the active material in the dispersed phase. In certain cases, the abrasive can however comprise partially soluble salts which dissolve when the product is diluted. In the third class, the structure is usually used for thickening products to give consumer-preferred flow properties, and sometimes to suspend pigment particles. Compositions of the first kind are described, for example, in our patent specification EP-A-38,101 whilst examples of those in the second category are described in our specification EP-A-104,452. Those in the third category are, for example, described in U.S. Pat. No. 4,244,840.

The dispersed structuring phase in these liquids is generally believed to consist of an onion-like configuration comprising concentric bilayers of detergent active molecules, between which is trapped water (aqueous phase). These configurations of active material are sometimes referred to as lamellar droplets. It is believed that the close-packing of these droplets enables the solid materials to be kept in suspension. The lamellar droplets are themselves a sub-set of lamellar structures which are capable of being formed in detergent active/aqueous electrolyte systems. Lamellar systems in general, are a category of structures which can exist in detergent liquids. The degree of ordering of liquid detergent structures, from simple spherical micelles, through disc and rod-shaped micelles to lamellar droplets and beyond progresses with increasing concentrations of the actives and electrolyte, as is well known, for example from the reference H.A. Barnes, 'Detergents' Ch. 2 in K. Walters (Ed.), 'Rheometry:Industrial Applications', J. Wiley & Sons, Letchworth 1980. The present invention is concerned with all such structured systems which are capable of suspending particulate solids, but especially those of the lamellar droplet kind.

The present invention solves a problem of introducing functional polymer ingredients into aqueous structured liquids. Functional polymer ingredients are those polymers which have a beneficial effect in use. The definition does not include those polymers, the sole function of which is to modify the rheology of the product. A very common type of functional polymer ingredient is a polymer builder. Functional polymer ingredients may also serve the wetting properties of liquid abrasive cleaners.

Our unpublished European patent application no. 88307007 claims and discloses use of certain polymers having a molecular weight of at least 1000 for reducing the viscosity of concentrated structured aqueous liquid detergents. Such viscosity reducing polymers may or may not also be functional.

Our unpublished European patent application no. 88307009 relates to use of polyacrylates or poly(meth)acrylates having molecular weights from 500 to 3000 for improving the wetting properties of a certain class of liquid abrasive cleaners.

Polymers have also been used for viscosity control in slurries intended for spray-drying, for example as described in specification EP-A-24,711. However, such slurries have no requirement of stability and so there is no difficulty with how the polymer should be incorporated.

Further, it is known that incorporation of 5% or more of fabric softening clays, (e.g. bentonites) in liquids can give rise to unacceptably high viscosity. One approach to mitigate this disadvantage has been to also incorporate a small amount of a low molecular weight polyacrylate. This is described in UK patent specification GB-A-2,168,717.

Surprisingly we have now found that a functional polymer ingredient can be incorporated up to relatively high levels, without unduly affecting viscosity and without destabilising the liquid, if the ingredient has an average molecular weight below 2000, provided that when the composition comprises:
 (a) at least 15% by weight of the detergent active material and from 1 to 30% by weight of a salting-out electrolyte; or
 (b) contains 5% or more of a swelling clay;
  then the average molecular weight of the polymer ingredient is less than 1000; and
  when the functional polymer material comprises 0.5% by weight or less, relative to the total composition, of an acrylate or methacrylate polymer having a molecular weight of 500 or greater, the detergent active material comprises a synthetic anionic surfactant and a soap and the composition is free from pentasodium triphosphate;
  then the composition is also substantially free from insoluble abrasive;
said composition yielding no more than 2% by volume phase separation upon storage at 25° C. for 21 days.

Suitable function polymer ingredients include polyethylene glycols, Dextran, Dextran sulphonates, polyacrylates, polymethacrylates and polyacrylate/maleic acid co-polymers.

Depending on the other components of the composition and the type and molecular weight of the particular polymer, it may be included at typically from 0.5% to 12.5% by weight of the total composition, for example from 1% to 10%. Most preferred are those functional polymer materials having an average molecular weight of 1000 or less.

The detergent active material may be selected from one or more of anionic, cationic, nonionic, zwitterionic and amphoteric surfactants, and mixtures thereof, provided the material forms a structuring system in the liquid. Most preferably, the detergent active material comprises
 (a) a nonionic surfactant and/or a polyalkoxylated anionic surfactant; and (b) a non-polyalkoxylated anionic surfactant.

Suitable nonionic surfactants which may be used include in particular the reaction products of compounds having a hydrophobic group and a reactive hydrogen atom, for example aliphatic alcohols, acids, amides or alkyl phenols with alkylene oxides, especially ethylene oxide either alone or with propylene oxide. Specific nonionic detergent compounds are alkyl ($C_6$–$C_{22}$) phenols-ethylene oxide condensates, the condensation products of aliphatic ($C_8$–$C_{18}$) primary or secondary linear or branched alcohols with ethylene oxide, and products made by condensation of ethylene oxide with the reaction products of propylene oxide and ethylenediamine. Other so-called nonionic detergent compounds include long chain tertiary amine oxides, long chain tertiary phosphine oxides and dialkyl sulphoxides.

The anionic detergent surfactants are usually water-soluble alkali metal salts of organic sulphates and sulphonates having alkyl radicals containing from about 8 to about 22 carbon atoms, the term alkyl being used to include the alkyl portion of higher acyl radicals. Examples of suitable synthetic anionic detergent compounds are sodium and potassium alkyl sulphates, especially those obtained by sulphating higher ($C_8$–$C_{18}$) alcohols produced for example from tallow or coconut oil, sodium and potassium alkyl ($C_9$–$C_{20}$) benzene sulphonates, particularly sodium linear secondary alkyl ($C_{10}$–$C_{15}$) benzene sulphonates; sodium alkyl glyceryl ether sulphates, especially those ethers of the higher alcohols derived from tallow or coconut oil and synthetic alcohols derived from petroleum; sodium coconut oil fatty monoglyceride sulphates and sulphonates; sodium and potassium salts of sulphuric acid esters of higher ($C_8$–$C_{18}$) fatty alcohol-alkylene oxide, particularly ethylene oxide, reaction products; the reaction products of fatty acids such as coconut fatty acids esterified with isethionic acid and neutralised with sodium hydroxide; sodium and potassium salts of fatty acid amides of methyl taurine; alkane monosulphonates such as those derived by reacting alpha-olefins ($C_8$–$C_{20}$) with sodium bisulphite and those derived from reacting paraffins with $SO_2$ and $Cl_2$ and then hydrolysing with a base to produce a random sulphonate; and olefin sulphonates, which term is used to describe the material made by reacting olefins, particularly C10–C20 alpha-olefins, with SO3 and then neutralising and hydrolysing the reaction product. The preferred anionic detergent compounds are sodium ($C_{11}$–$C_{15}$) alkyl benzene sulphonates and sodium ($C_{16}$–$C_{18}$) alkyl sulphates. The total amount of surfactant material will typically be from 10–50%, preferably from 15 to 40% and most preferably from 20 to 30% by weight of the total composition.

The compositions preferably will contain a salting-out electrolyte. This has the meaning ascribed to it in specification EP-A-79,646. Optionally, some salting-in electrolyte (as defined in the latter specification) may also be included, provided if of a kind and in an amount compatible with the other components and the composition is still in accordance with the definition of the invention claimed herein. Some or all of the electrolyte (whether salting-in or salting-out) may have detergency builder properties. In any event, it is preferred that compositions according to the present invention include detergency builder material, some or all of which may be electrolyte. The builder material is any capable of reducing the level of free calcium ions in the wash liquor and will preferably provide the composition with other beneficial properties such as the generation of an alkaline pH, the suspension of soil removed from the fabric and the dispersion of the fabric softening clay material. Typically the total amount of electrolyte will be from 1 to 60%, preferably from 10 to 50%, most preferably from 20 to 45% by weight of the total composition.

The compositions of the present invention have solid suspending capability, and include those compositions which actually contain particulate solids in suspension. Such solids may be undissolved electrolyte or a water-soluble or water-insoluble detergency builder (whether or not the builder is also an electrolyte), and/or a water-soluble or water-insoluble abrasive (provided allowed according to the definition of the present invention).

Examples of phosphorus-containing inorganic detergency builders, when present, include the water-soluble salts, especially alkali metal pyrophosphates, orthophosphates, polyphosphates and phosphonates. Specific examples of inorganic phosphate builders include sodium and potassium tripolyphosphates, phosphates and hexametaphosphates.

Examples of non-phosphorus-containing inorganic detergency builders, when present, include water-soluble alkali metal carbonates, bicarbonates, silicates and crystalline and amorphous alumino silicates. Specific examples include sodium carbonate (with or without calcite seeds), potassium carbonate, sodium and potassium bicarbonates, silicates and zeolites.

Examples of organic detergency builders, when present, include the alkaline metal, ammonium and substituted ammonium polyacetates, carboxylates, polycarboxylates, polyacetyl carboxylates and polyhydroxsulphonates. Specific examples include sodium, potassium, lithium, ammonium and substituted ammonium salts of ethylenediaminetetraacetic acid, tartrate mono succinate, tartrate di succinate, nitrilotriacetic acid, oxydisuccinic acid, melitic acid, benzene polycarboxylic acids and citric acid.

In the context of organic builders, it is also possible to incorporate a viscosity reducing polymer according to our aforementioned non-pre-published European patent application no. 301 883. Such polymers are substantially totally soluble in the composition. It is also possible to incorporate polymer ingredients which are only partly dissolved, as related in our non pre-published European patent application no. 301 882.

The use of only partly dissolved polymers allows a viscosity reduction (due to the polymer which is dissolved) whilst incorporating a sufficiently high amount to achieve a secondary benefit, especially building, because the part which is not dissolved does not bring about the instability that would occur if substantially all were dissolved.

Examples of partly dissolved polymers include many of the polymer and co-polymers salts already known as detergency builders. For example, may be used (including building and non-building polymers) polyethylene glycols, polyacrylates with molecular weights of at least 2000, polymaleates, polysugars, polysugarsulphonates and co-polymers of any of these. Preferably, the partly dissolved polymer comprises a co-polymer which includes an alkali metal salt of a polyacrylic, polymethacrylic or maleic acid or anhydride. Preferably, compositions with these co-polymers have a pH of above 8.0. In general, the amount of such viscosity reducing polymer can vary widely according to the formulation of the rest of the composition. However, typical amounts are from 0.5 to 4.5% by weight.

The optional polymer which is substantially totally soluble in the aqueous phase must have an electrolyte resistance of more than 5 grams sodium nitrilotriacetate in 100 ml of a 5% by weight aqueous solution of the polymer, said second polymer also having a vapour pressure in 20% aqueous solution, equal to or less than the vapour pressure of a reference 2% by weight or greater aqueous solution of polyethylene glycol having an average molecular weight of 6000; said second polymer having a molecular weight of at least 1000.

The incorporation of the soluble polymer permits formulation with improved stability at the same viscosity (relative to the composition without the soluble polymer) or lower viscosity with the same stability. The soluble polymer can also reduce viscosity drift, even when it also brings about a viscosity reduction.

It is especially preferred to incorporate the soluble polymer together with a partly dissolved polymer which has a large insoluble component, although the latter may be used without the former. That is because the building capacity of the partly dissolved polymer will be good (since relatively high quantities can be stably incorporated), the viscosity reduction will not be optimum (since little will be dissolved). Thus, the soluble polymer can usefully function to reduce the viscosity further, to an ideal level.

The soluble polymer can, for example, be incorporated at from 0.05 to 20% by weight, although usually, from 0.1 to 2.5% by weight of the total composition is sufficient, and especially from 0.2 to 1.5% by weight. Levels above these may cause instability. A large number of different polymer may be used as such a soluble polymer, provided the electrolyte resistance and vapour pressure requirements are met. The former is measured as the amount of sodium nitrilotriacetate (NaNTA) solution necessary to reach the cloud point of 100 ml of a 5% solution of the polymer in water at 25{C, with the system adjusted to neutral pH, i.e. about 7. This is preferably effected using sodium hydroxide. Most preferably, the electrolyte resistance is 10 g NaNTA, especially 15 g. The latter indicates a vapour pressure low enough to have sufficient water binding capability, as generally explained in the applicant's specification GB-A-2 053 249. Preferably, the measurement is effected with a reference solution at 10% by weight aqueous concentration, especially 18%.

Typical classes of polymers which may be used as the soluble polymer, provided they meet the above requirements, include any of those specified above as examples of the functional polymer materials, but having instead, an average molecular weight of at least 2000.

The soluble polymer must have an average molecular weight of at least 1000 but a minimum average molecular weight of 2000 is preferred.

Compositions of the invention preferably have a viscosity at $21s^{-1}$ of less than 1,500 mPas, more preferred less than 1,000 mPas. The pH of the compositions is preferably from 7.5 to 12.5.

Apart from the ingredients already mentioned, a number of optional ingredients may also be present, for example lather boosters such as alkanolamides, particularly the monoethanolamides derived from palm kernel fatty acids and coconut fatty acids, lather depressants, oxygen-releasing bleaching agents such as sodium perborate and sodium percarbonate, peracid bleach precursors, chlorine-releasing bleaching agents such as tricloroisocyanuric acid, inorganic salts such as sodium sulphate, and, usually present in very minor amounts, fluorescent agents, perfumes, enzymes such as proteases and amylases, germicides and colourants.

The invention will now be illustrated by the following non-limiting examples.

TABLE 1

Composition of the reference sample

| Component | Composition (% w/w) |
|---|---|
| NaLAS (1) | 10.4 |
| Synperonic A7 (2) | 6.7 |
| NaCl | 4.6 |
| Water | up to 100 |
| Polymer | if added, on top of formulation |

(1) Sodium dodecyl benzene sulphonate
(2) C12-13 fatty alcohol alkoxylated with an average of 7 moles of ethylene oxide per molecule.

TABLE 2

Product properties of composition of Table 1 with added Poly ethylene glycol. Variation in molecular weight.

| Polymer | | Product | |
|---|---|---|---|
| Mol. weight | % | Stability | Vicosity (mPas)** |
| — | 0 | Stable | 1060 |
| 600 | 4.8 | Stable | 990 |
| 1,000 | 4.8 | Stable | 760 |
| 2,000 | 4.8 | Unstable | 120 |
| 4,000 | 4.8 | Unstable | 480 |
| 6,000 | 4.8 | Unstable | 440 |
| 10,000 | 4.8 | Unstable | 190 |

*Stable means no more phase separation than 2% by volume after two months storage at room temperature.
**measured at a shear rate of $21s^{-1}$

TABLE 3

Product properties of compositions of Table 1 with added Poly ethylene glycol. Variation in level and mol. weight.

| Polymer | | Product | |
|---|---|---|---|
| Mol. weight | % | Stability | Viscosity (mPas)** |
| — | 0 | Stable | 940 |
| 600 | 3.8 | Stable | 930 |
| 600 | 7.6 | Stable | 1020 |
| 600 | 11.5 | Stable | 770 |
| 600 | 15.3 | Stable | 560 |
| 1,000 | 2.9 | Stable | 800 |
| 1,000 | 5.7 | Stable | 820 |
| 1,000 | 8.6 | Stable | 590 |
| 1,000 | 11.5 | Stable | 380 |
| 2,000 | 1.0 | Stable | 700 |
| 2,000 | 1.9 | Stable | 540 |
| 2,000 | 2.9 | Stable | 280 |
| 2,000 | 3.8 | Unstable | 110 |
| 2,000 | 4.8 | Unstable | 120 |
| 4,000 | 1.0 | Stable | 210 |
| 4,000 | 1.9 | Unstable | 300 |
| 6,000 | 0.5 | Stable | 340 |
| 6,000 | 1.0 | Unstable | 170 |
| 6,000 | 1.4 | Unstable | 370 |
| 10,000 | 0.5 | Stable | 210 |
| 10,000 | 1.0 | Unstable | 430 |

TABLE 4

Product properties of compositions of Table 1 with added Sodium poly acrylate. Variation in level and mol. weight.

| Polymer | | Product | |
|---|---|---|---|
| Mol. weight | % | Stability*** | Viscosity (mPas)** |
| — | 0 | Stable | 710 |
| 1,200 | 0 | Stable | 730 |
| 1,200 | 0.50 | Stable | 520 |
| 1,200 | 1.00 | Stable | 450 |
| 2,500 | 0 | Stable | 630 |

TABLE 4-continued

Product properties of compositions of
Table 1 with added Sodium poly acrylate.
Variation in level and mol. weight.

| Polymer | | Product | |
|---|---|---|---|
| Mol. weight | % | Stability*** | Viscosity (mPas)** |
| 2,500 | 0.50 | Stable | 410 |
| 4,000 | 0 | Stable | 150 |
| 4,000 | 1.00 | Unstable | 130 |
| 8,000 | 0 | Stable | 380 |
| 8,000 | 0.50 | Stable | 130 |
| 8,000 | 1.00 | Unstable | 110 |

***Stable means no more phase separation than 2% by volume after 21 days storage at 25° C.

TABLE 5

Composition of reference sample 2.

| Component | Composition (% w/w) |
|---|---|
| NaLAS (1) | 7.2 |
| Synperonic A3 (3) | 2.4 |
| LES (4) | 2.4 |
| Zeolite 4A (anhydrous) | 20.0 |
| Citric acid | 1.5 |
| Glycerol | 8.0 |
| Borax | 5.7 |
| NaOH to adjust the pH to 8.5 | |
| Polymer | var see Table 6 |
| Water | up to 100 |

(1) Sodium dodecyl benzene sulphonate.
(3) C12-13 fatty alcohol alkoxylated with an average of 3 moles of ethylene oxide per molecule.
(4) Lauryl Ether Sulphate (Approx 3EO).

TABLE 6

Product properties of composition of Table 5
with added Sodium Poly Acrylate. Variation in
level and mol. weight

| Polymer | | Product | |
|---|---|---|---|
| Mol weight | % | Stability*** | Viscosity (mPas)** |
| — | 0 | Stable | 1250 |
| 1,200 | 0.2 | Stable | 1190 |
| 1,200 | 0.5 | Stable | 1030 |
| 2,500 | 0.2 | Stable | 1250 |
| 2,500 | 0.5 | Unstable | 500 |
| 4,000 | 0.2 | Stable | 360 |
| 4,000 | 0.5 | Unstable | 100 |

**At 21s$^{-1}$
***Stable means no more phase separation than 2% by volume after 21 days storage at 25° C.

What is claimed is:

1. An aqueous liquid detergent composition substantially free of insoluble abrasive comprising water, electrolyte and from 15 to 50% by weight of detergent active material in amounts sufficient to form a structuring system capable of suspending particulate solids, said composition further comprising from 0.5 to 12.5% by weight of a functional polymer selected from the group consisting of polyethylene glycols, Dextran, Dextran sulphonates, plyacrylates, polymethacrylates, polyacrylate/maleic acid copolymers and salts or part salts thereof, said functional polymer ingredient having an average molecular weight below 2000, provided that when the composition comprises:
   (a) at least 15% by weight of the detergent active material and from 1 to 30% by weight of a salting-out electrolyte; or
   (b) contains 5% or more of a swelling clay;
   then the average molecular weight of the polymer ingredient is less than 1000; and
   said composition yielding no more than 2% phase separation by volume upon storage at 25° C. for 21 days, and having a viscosity of less than 1500 mPas at 21 s$^{-1}$.

2. A composition according to claim 1, wherein the average molecular weight of the polymer material is 1000 or less.

3. A composition according to claim 1, comprising suspended particulate solid material.

4. A composition according to claim 3, wherein the suspended solid material comprises an electrolyte/detergency builder.

5. A composition according to claim 3, wherein the suspended solid material comprises an abrasive.

6. A composition according to claim 1, wherein the detergent active material comprises:
   (a) a nonionic surfactant and/or a polyalkoxylated anionic surfactant; and
   (b) a non-polyalkoxylated anionic surfactant.

7. A composition according to claim 1, further comprising a viscosity reducing polymer which is only partly dissolved in the aqueous phase.

8. A composition according to claim 1, further comprising a second viscosity reducing polymer which is substantially totally soluble in the aqueous phase and has an electrolyte resistance of more than 5 grams sodium nitrilotriacetate in 100 ml of a 5% by weight aqueous solution of the polymer, said second polymer also having a vapour pressure in 20% aqueous solution, equal to or less than the vapour pressure of a reference 2% by weight or greater aqueous solution of polyethylene glycol having an average molecular weight of 6000; said second polymer having a molecular weight of at least 1000.

* * * * *